UNITED STATES PATENT OFFICE.

JENS SIMONI, OF KEYPORT, NEW JERSEY, ASSIGNOR TO HARRY CLARKSON, OF FLUSHING, NEW YORK.

PUNCTURE-HEALING LIQUID FOR TIRES.

1,109,151.  Specification of Letters Patent.  Patented Sept. 1, 1914.

No Drawing.  Application filed December 11, 1913.  Serial No. 806,092.

*To all whom it may concern:*

Be it known that I, JENS SIMONI, a subject of the King of Denmark, and resident of Keyport, in the county of Monmouth and State of New Jersey, have invented a new and useful Improvement in Puncture-Healing Liquids for Tires, of which the following is a specification.

This invention relates to a liquid composition intended to be inserted within pneumatic vehicle tires for the instant healing of punctures, and among other objects, it is calculated to not only be free from substances which injure the tire, but to actually be beneficial to the rubber structure.

It is also adapted to lessen the heating effect of the friction upon the tire while the vehicle is in motion, to prevent the rubber from drying out, to instantly heal any puncture, thereby preventing the escape of air and hence injury to the tire by use in a partially deflated condition.

Further, it may be kept in any convenient air-tight container and is very readily applied for use.

The composition which is the subject-matter of this invention consists of a very thick and viscous liquid which is adapted to be inserted, in a predetermined amount, within the cavity of the tire, and then, by means of centrifugal force generated during the motion of the vehicle, be caused to spread in a relatively thin film over the surface of the tire. In the case of a single tube tire, it is put within the tube, and in the case of a double tube tire, it is put within the so-called inner tube.

The method of putting the healing liquid in the tire which I prefer, consists in removing the valve from the tire and pouring the thick and viscous liquid therein through a funnel, or inserting it by means of a coarse grease gun. I have found that a proper amount to be used consists in from about a pint and a half to three pints for each tire according to the size thereof.

The liquid includes among its components, asbestos, gum, acid and water; and in the particular form which I prefer, it includes asbestos fiber, asbestos cement, gum arabic, gum tragacanth, chromic acid and water. The best proportions of these ingredients of which I am aware at the present time is as follows: four pounds of asbestos fiber, ten pounds of asbestos cement, three pounds of gum arabic, one-tenth pound of gum tragacanth, one-fourth pound of chromic acid and seventy-four pounds of water. These ingredients, when mixed together, will make about fifteen gallons of the healing liquid.

In mixing these ingredients I proceed as follows: The gum arabic is first dissolved in part of the water, which may be either cold or warm according to the weather and the desired speed of dissolving. The gum tragacanth is similarly dissolved by itself in part of the water. These two solutions of gum and water are then mixed together and the asbestos fiber, which has previously been carded and kneaded, is mixed in with the gums and water, together with an added amount of water sufficient to keep the mixture in the form of a liquid. The asbestos cement is next added, together with some more water, and finally the chromic acid is admixed in conjunction with the remaining portion of water, and the whole thoroughly stirred. As indicated above, the water is added during the mixing in sufficient amounts to maintain the composition in a liquid, so that it can be stirred.

The asbestos is a very valuable element for the reason that it tends to prevent undue expansion of the air within the tire while the vehicle is in motion and hence removes unnecessary strains from the tire structure.

The chromic acid serves a very useful purpose in causing a rapid hardening of the healing mixture by contact with the atmosphere, while the proportion used is so small as not to sensibly injure the tire.

It will be understood that while I have described the particular ingredients and the proportions thereof for the purpose of clearly setting forth the best way known to me in which the invention can be utilized, I do not intend to limit the claims except in so far as the limitations are specified in the claims themselves; and hence I do not consider my invention as being confined to the particular ingredients and proportions set forth.

What I claim is:

1. A puncture healing liquid including asbestos, gum and chromic acid.

2. A puncture healing liquid including asbestos, gum arabic, gum tragacanth, and chromic acid.

3. A puncture healing liquid including asbestos, gum, chromic acid and water.

4. A puncture healing liquid including asbestos, gum arabic, gum tragacanth, chromic acid and water.

5. A puncture healing liquid consisting of asbestos fiber, asbestos cement, gum arabic, gum tragacanth, chromic acid and water.

6. A puncture healing liquid consisting of asbestos fiber, asbestos cement, gum arabic, gum tragacanth, chromic acid and water in substantially the following proportions: four pounds asbestos fiber, ten pounds asbestos cement, three pounds gum arabic, one-tenth pound gum tragacanth, one-fourth pound chromic acid and seventy-four pounds water.

In testimony that I claim the foregoing as my invention, I have signed my name in presence of two witnesses, this twenty fourth day of November, A. D. 1913.

JENS SIMONI.

Witnesses:
CLIFTON L. RAPP,
J. H. HENDRICKSON.